United States Patent Office 3,425,819
Patented Feb. 4, 1969

3,425,819
METHOD OF PREPARING A COMPLEX FERTILIZER COMPRISING UREA COATED WITH AMMONIUM PHOSPHATE
Lewis Arthur Barry, Wilmette, Ill., and Elmer J. Arveson, San Carlos, Calif., said Barry assignor to International Minerals & Chemical Corporation, a corporation of New York, said Arveson assignor to Chevron Research Company, San Francisco, Calif., a corporation of Delaware
No Drawing. Filed May 24, 1965, Ser. No. 458,423
U.S. Cl. 71—29        4 Claims
Int. Cl. C05c 9/00

ABSTRACT OF THE DISCLOSURE

High nitrogen content fertilizers are prepared by coating urea prills with an ammonium phosphate composition in the presence of ammonia and then drying the resulting granules.

---

This invention concerns an improved method for the preparation of a complex fertilizer. More particularly, this invention concerns an improved method for the preparation of a complex fertilizer which contains urea as the major nitrogen source.

Because of the high percentage of available nitrogen in urea, it is a particularly desirable component for fertilizers. Urea is readily available from the reaction of carbon dioxide and ammonia. However, in the presence of water at elevated temperatures, particularly at high or low pH, urea is readily hydrolyzed to its components resulting in a significant economic loss. Furthermore, during the manufacture of the fertilizer, biuret may be formed which is toxic to plants and therefore undesirable. Urea suffers from the further disadvantage of being hygroscopic and caking when stored.

In order to prepare a satisfactory solid granular complex fertilizer incorporating urea, it is necessary to minimize the hydrolysis of the urea during the formation of the complex fertilizer and to avoid, completely if possible, the formation of biuret. Furthermore, it is essential that the urea be almost completely coated with a nonhygroscopic coating so that the fertilizer does not cake on storage.

Pursuant to this invention, complex solid granular fertilizers are prepared containing urea as their major nitrogen source by spraying onto a rolling bed of urea prills and fertilizer fines an aqueous slurry of mono- and diammonium phosphate having an $NH_3:H_3PO_4$ mole ratio in a narrow range, in the presence of ammonia vapor in stoichiometric excess over the amount required to change all of the ammonium phosphate to diammonium phosphate, and then drying the granules to a desired moisture content and recycling a portion of the granules as fines.

The process will be considered according to the following outline:

(I) Ammoniation of wet process phosphoric acid:
  (A) Wet process phosphoric acid
  (B) Ammoniating conditions
  (C) Characteristics of the aqueous slurry
(II) Coating of urea prills:
  (A) Description of coating equipment
  (B) Description of urea prills
  (C) Presence of other materials
  (D) Ammoniating conditions
  (E) Temperature and other conditions
  (F) Description of product
(III) Drying and sizing:
  (A) Drying conditions
  (B) Sizing
  (C) Miscellaneous The first step of the process is the ammoniation or partial neutralization of wet process phosphoric acid. Wet process phosphoric acid is usually obtained by the acidulation of phosphate rock with sulfuric acid and then separating the supernatant liquid from the solids formed, e.g., calcium sulfate. The wet process phosphoric acid contains numerous trace elements. These include iron and aluminum. While on the one hand the trace elements increase the nutrient value of the fertilizer for plants, the presence of the trace elements interfere with maintaining flowable slurries when ammoniating the wet process phosphoric acid. The trace metals form thixotropic salts which set up the mixture of mono- and diammonium phosphates as hard nonflowable colloids. This problem is avoided by the present process.

The wet process phosphoric acid used should have at least 39% $P_2O_5$ (weight percent of $P_2O_5$) present in the aqueous mixture. While wet process phosphoric acid having concentrations as high as 54% $P_2O_5$ may be used, these should be diluted down with water to about 40 to 45% $P_2O_5$. Preferably, the wet process phosphoric acid as introduced will have from about 40 to 42% $P_2O_5$.

The ammonia and wet process phosphoric acid is generally added simultaneously to a vessel, usually in the desired stoichiometric ratio. The heat resulting from the neutralization of phosphoric acid will usually be sufficient to maintain the temperature in the range of about 220° to 250° F., preferably 235° to 245° F. Sufficient ammonia is added to form an aqueous slurry of monoammonium and diammonium phosphate having an $NH_3:H_3PO_4$ mole ratio in the range of 1.3 to 1.4, preferably 1.32 to 1.35.

The pH of the resulting aqueous slurry will be in the range of about 5.5 to 6.5, desirably in the range of about 5.8 to 6.2. Its specific gravity at about 230° F. will be about 1.42 to 1.54 grams per ml., preferably 1.48 to 1.51 g./ml. The weight percent of water will be in the range of about 15 to 20%, more usually 17 to 18%.

The aqueous slurry described above is pumpable and flowable and can be transferred by pumping or gravity flow to the ammoniator-granulator. In the ammoniator-granulator the urea prills are coated with a mixture, as described above, of mono- and diammonium phosphate and the monoammonium phosphate reacted with ammonia to form diammonium phosphate.

The ammoniator-granulator is basically a rotating drum. Solid particles are fed into the drum which form a bed of rolling particles. Above the bed, parallel to the drum's axis, is a pipe with a plurality of holes which serves to distribute the flurry of monoammonium and diammonium phosphates as fine streams onto the bed. Under the bed, parallel to the first pipe, is another pipe having a thin slit throughout most of its length and a plurality of openings for the introduction of ammonia vapor. The slit serves to distribute the ammonia vapor relatively evenly throughout the bed of solid particles.

The urea prills which are introduced into the ammoniator-granulator will generally be only a portion of the solid particles introduced. The size of the urea prills is critical to the proper preparation of granular particles. The prills should be of a mesh size in the range of −6+60, preferably −6+20 Tyler mesh. The prills should have an average diameter in the range of about 0.032 to 0.040 inch.

Other solids introduced to maintain the bed will be recycled fines. That is, particles which have been formed and were too small or too large as compared to the desired size granule. The oversized particles are ground to form fines. Also, inert earths or other inert material may be added as desired. The size of the fines and the inert filler will be not larger than the urea prills and preferably smaller than the urea prills. That is, the average diameter will be preferably less than 0.032.

The ammonia vapor introduced should be in significant excess of the amount required for the formation of the diammonium phosphate from the monoammonium phosphate present. The excess ammonia should be at least 20% greater than stoichiometric and desirable in the range of 25 to 100% greater. While even greater excesses of ammonia vapor may be used, it is found that no advantage is obtained and the loss of ammonia is uneconomical.

The ratio of urea prills to other solids—fertilizer fines and inert filler, when present—as well as to the aqueous slurry, is critical to the preparation of properly coated urea, with a minimum of both hydrolysis and formation of biuret. Depending on the ultimate composition of the fertilizer, about 0.5 to 1 part of urea will be introduced per part of slurry, and about 5 parts to 8 parts of recycled fines per part of slurry. In addition, from 0 to 1 part of filler per part of slurry may also be added.

The temperature in the ammoniator-granulator will be in the range of about 120° to 180° F., desirably 140° to 160° F. The heat from the neutralization will usually be sufficient to maintain this temperature. However, external heat may be required.

The particles or granules coming out of the ammoniator-granulator will, for the most part, be hard round particles having urea cores surrounded by a coating of diammonium phosphate. They will usually have about 3 to 6 weight percent of water and will require further drying. The fertilizer units as N and $P_2O_5$ will generally be at least about 40 and may be 60 or higher.

The solid granules are then transferred to a drier which is operated at a temperature in the range of 140° to 200° F. The residence time for the particles in the drier will be in the range of about 5 to 60 minutes.

The particles are now sized by means of screens. The undersized or fines are recycled back to the ammoniator-granulator along with the pulverized oversized particles. The screening of the particles is carried out at elevated temperatures, preferably in the range of about 125° to 185° F. The material which is returned to the ammoniator-granulator is referred to as recycled fines.

The moisture content of the final product will generally be in the range of about 1 to 3 weight percent. The amount of material returned as recycled fines will usually be about 50 to 85 weight percent of the product withdrawn from the drier.

The product as obtained has less than 1% of biuret and at least 90% of the $P_2O_5$ is water soluble. The water solubility is desirable for a satisfactory fertilizer in order to make the phosphorus available to the plants. The urea is at least 60% and generally 65 to 80% of the available nitrogen.

The following example illustrates a typical preparation of 20:20:0 NPK fertilizer.

Into a vessel (neutralizer) was introduced phosphoric acid (47.1% $P_2O_5$) at a rate of 430 lbs./hr., liquid ammonia at a rate of 67 lbs./hr., and water at a rate of 57 lbs./hr. The temperature in the reactor was maintained at about 240° F. The slurry which overflowed the reactor had a pH of about 6 and a specific gravity of about 1.8 g./ml. Its composition was 11.45% ammoniacal nitrogen, 42.01% $P_2O_5$ and 17.1% water.

The overflow from the neutralizer was transferred to the ammoniator-granulator and sprayed directly onto a bed of rolling fines—urea prills, recycled fines, inert filler. The bed of fines was maintained by introducing urea prills at a rate of 287 lbs./hr. (−12+20 Tyler mesh), recycled fines at a rate of 2,430 lbs./hr. (−12 Tyler mesh) and inert filler at the rate of 295 lbs./hr. Ammonia was fed into the ammoniator at a rate of 35 lbs./hr. (34% excess over that required for formation of diammonium phosphate from the monoammonium phosphate present). The temperature in the ammoniator was about 140–150° F.; the granules withdrawn from the ammoniator had a discharge temperature of about 153° F. The composition was 5.29% ammoniacal nitrogen, 17.64% urea nitrogen, 16.44% $P_2O_5$, and 3.22% water. 33.5% of the particles had a mesh size in the range of −6+12.

The particles were then dried in a drier in which the inlet air temperature was about 250° to 350° F. and the exit temperature of the particles about 175° F. The moisture content of the particles was about 1.7%. The particles were then separated by means of screens; the particles having the desired mesh size (−6+12) had the following composition: 6.91% ammoniacal nitrogen, 13.6% urea nitrogen, 20.52% $P_2O_5$ and 1.68% water. The $P_2O_5$ was 93.3% water soluble, and the amount of biuret was less than 1%. Hydrolysis of the urea was less than 5%.

It is evident from the foregoing that by using only a partially neutralized wet process phosphoric acid—a mixture of mono- and diammonium phosphate with a narrow ammonia to $H_3PO_4$ mole ratio—to coat urea prills in the presence of large amounts of fines, composed of fertilizer having the desired composition, at a specified temperature range and in the presence of a relatively large excess of ammonia vapor, the formation of biuret is minimized, the loss of urea by hydrolysis is almost completely avoided, and a fertilizer having substantially all of the phosphorus and nitrogen available to the plant is obtained.

As will be evident to those skilled in the art, various modifications on this process can be made or followed, in the light of the foregoing disclosure and discussion, without departing from the spirit or scope of the disclosure or from the scope of the following claims.

We claim:
1. A method for preparing complex fertilizer having urea as its major nitrogen source, which comprises:
  in a reaction zone spraying onto a rolling bed of urea prills and recycled fines an aqueous slurry consisting essentially of mono- and diammonium phosphate in an ammonia atmosphere at a temperature in the range of about 140° to 200° F.;
  drying the resulting granules at a temperature in the range of 140° to 200° F. for a time sufficient to lower the moisture content below 3 weight percent;
  screening the material from the drier, separating the desired size granules from the oversized and undersized particles, pulverizing the oversized particles and combining the pulverized particles with the undersized particles to be used as said recycled fines;
  wherein the aqueous slurry has an $NH_3$ to $H_3PO_4$ mole ratio in the range of 1.3 to 1.4 and a $P_2O_5$ content of from 40 to 45 weight percent;
  the urea prills have an average size in the range of about −6+60 mesh and the recycled fines are of not greater size than said urea prills; and
  the weight ratio of addition to the reaction zone of aqueous slurry, urea prills, recycled fines and ammonia is 1:0.5–1:5–8:0.1–0.3, respectively, wherein the amount of ammonia is in at least 20% excess of that required to transform all of the monoammonium phosphate to diammonium phosphate.
2. A method according to claim 1, wherein the $NH_3$ to $H_3PO_4$ mole ratio in the aqueous slurry is 1.32 to 1.35 and the aqueous slurry has 40 to 42% $P_2O_5$.
3. A method according to claim 1, wherein the urea prills are of a mesh size of −6+20.
4. A fertilizer composition prepared as described in claim 1.

References Cited

UNITED STATES PATENTS 3,333,939  8/1967  Davis et al. _____ 71—29

DONALL H. SYLVESTER, *Primary Examiner.*

R. D. BAJEFSKY, *Assistant Examiner.*

U.S. Cl. X.R.

106—286; 117—100; 252—385, 35, 64